Feb. 16, 1960     L. P. FRIEDER ET AL     2,925,098
BALLISTIC FABRIC
Filed July 26, 1955
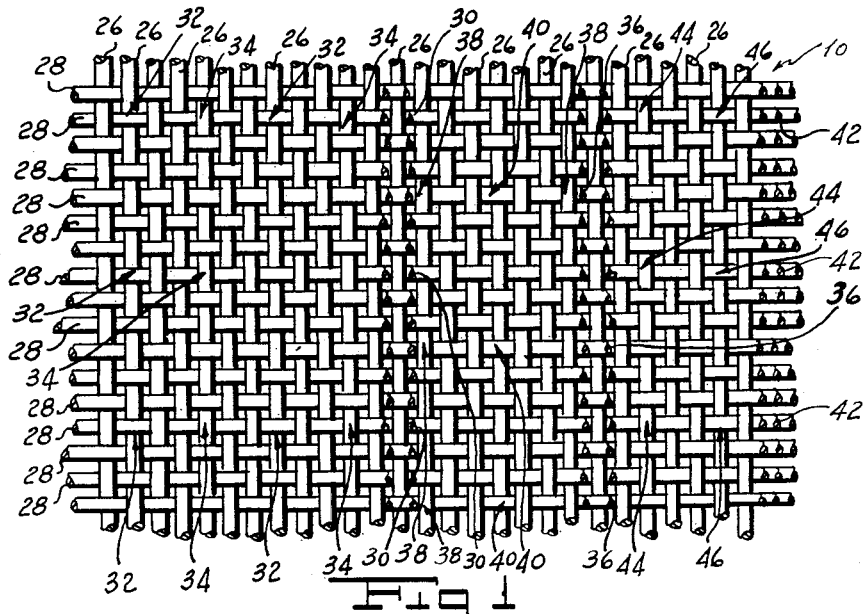
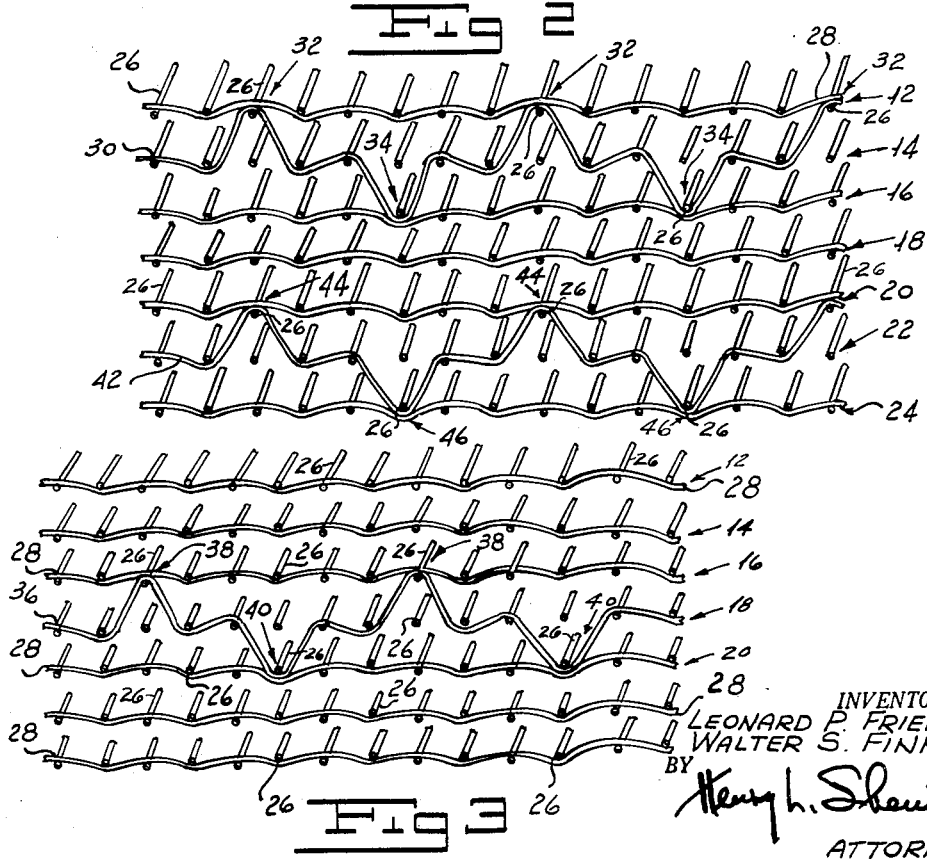
INVENTORS
LEONARD P. FRIEDER
WALTER S. FINKEN
BY
ATTORNEY

United States Patent Office 2,925,098
Patented Feb. 16, 1960

2,925,098

BALLISTIC FABRIC

Leonard P. Frieder, Great Neck, and Walter S. Finken, Brooklyn, N.Y., assignors to Gentex Corporation, New York, N.Y., a corporation of Delaware Application July 26, 1955, Serial No. 524,396

5 Claims. (Cl. 139—408)

Our invention relates to an improved ballistic fabric and more particularly to an improved ballistic fabric for resisting penetration by flying fragments, missiles, and the like.

Protective armor formed from laminated assemblies of plastic material, such as synthetic resin, is replacing metallic armor for protecting personnel and equipment from injury or damage by flying fragments, missiles, and like projectiles. This laminated plastic material protective armor is more flexible, lighter, and more easily formed into suitable shapes than is the metallic armor of the prior art. In our copending application, Serial No. 362,338, filed June 17, 1953, now Patent No. 2,816,578, we disclose a ballistic cloth from which protective armor may be formed. This cloth has a high degree of resistance to penetration by flying fragments, missiles, and like projectiles. Articles of wearing apparel or the like may readily be formed from this ballistic cloth. These articles not only afford a high degree of protection to the wearer, but they are comfortable and afford freedom of movement to a wearer.

The ballistic cloth disclosed in our said copending application includes a plurality of fabric layers. Selected yarns of each of the layers are drawn into an adjacent layer or laminate at selected points to form part of the laminate into which they are drawn. We have found that where a large number of laminates are included in the cloth, the bonds provided by the yarns passing between adjacent laminates are spaced at considerable distances from each other. We have invented an improved ballistic fabric including any number of fabric laminates bonded by selected yarns from selected laminates. The construction of our improved ballistic fabric is such that a predetermined spacing of bonds between adjacent laminates may be maintained no matter how many fabric laminates are included in the fabric. It will be appreciated that we are thus able partially to control the penetration-resisting properties of the fabric.

One object of our invention is to provide an improved ballistic fabric for resisting penetration by flying fragments, missiles, and like projectiles.

Another object of our invention is to provide an improved ballistic fabric including a number of fabric laminates bonded together by bonds, the spacing between which may be held constant no matter how many laminates are included in the fabric.

A further object of our invention is to provide an improved ballistic fabric, the penetration-resisting properties of which may be controlled.

Other and further objects of our invention will appear from the following description.

In general, our invention contemplates the provision of an improved ballistic fabric including a plurality of layers of fabric laminates. Selected yarns of a laminate immediately adjacent to and intermediate a pair of laminates are drawn into the pair of laminates at selected points to form bonds between the intermediate laminate and the pair of immediately adjacent laminates. The first three laminates from top to bottom of our improved ballistic fabric are bonded by selected yarns of the intermediate laminate of this group. The third laminate forms the top laminate of the next group of three laminates which are bonded together by selected yarns of the intermediate laminate of his group. We follow this bonding procedure throughout our improved fabric. We space the bonds formed by the selected yarns of the intermediate laminates to achieve a high degree of resistance to penetration by flying fragments, missiles, and like projectiles. Ballistic armor may readily be formed from a layer or layers of our improved ballistic fabric.

In the accompanying drawings which form part of the instant specification and which are to be read in conjunction therewith and in which like reference numerals are used to indicate like parts in the various views:

Figure 1 is a plan view of a seven-layer form of our improved ballistic fabric with warp yarns broken away to show the seven layers, with arrows to indicate the projected position of the interlayer bonds.

Figure 2 is a fragmentary perspective view of our improved ballistic fabric showing certain of the bonds between the laminates of the fabric.

Figure 3 is a fragmentary perspective view of a portion of our ballistic fabric other than that shown in Figure 2, showing certain of the other bonds between laminates of our fabric.

More particularly referring now to the drawings, our improved ballistic fabric, indicated generally by the reference character 10, includes a plurality of fabric laminates such, for example, as seven laminates, indicated generally by the reference characters 12, 14, 16, 18, 20, 22, and 24, shown in Figure 2. Each of the laminates includes a plurality of first yarns which may, for example, be weft yarns 26. Each of the laminates includes a plurality of warp yarns 28. While the weft and warp yarns 26 and 28 may be formed of any suitable material, preferably we form the yarns from synthetic resin, continuous filament threads spun to a predetermined number of convolutions per unit length. The manner in which we may form these yarns is disclosed in detail in our said copending application Serial No. 362,338.

We bond the fabric laminates of our ballistic fabric to each other by selected yarns from certain laminates passing into adjacent laminates. We do not, as in our copending application, select bonding yarns from each of the fabric laminates, but limit the bonding yarns to certain ones of the laminates. As can best be seen by reference to Figure 2, in order to bond the laminate 14, which is intermediate laminates 12 and 16, to laminate 12 and 16, we select warp yarns 30 from laminate 14 and draw them up into laminate 12 to engage weft yarns 26 of laminate 12 at points, indicated generally by the reference characters 32, to form bonds between laminates 12 and 14 at those points. After yarns 30 have been drawn up into laminate 12, they are returned to their "home" laminate for a predetermined distance and then drawn down into laminate 16 to engage weft yarns 26 at points, indicated generally by the reference characters 34, to provide bonds between laminates 14 and 16 at points 34. Other bonds 32 and 34 are formed, respectively, between laminates 12 and 14 and between laminates 14 and 16 at predetermined spaced points along the length of the selected bonding warp yarns 30. It is to be understood that we may space adjacent bonds 32 along the length of a bonding yarn 30 at any desired distance. Similarly, bonds 34 may be extended as desired. Conveniently, we retain a selected bonding yarn 30 in its home layer or laminate 14 through a distance of two picks, draw it up into laminate 12 for one pick, return it to its home layer for two picks, draw it down into laminate 16 for one pick, and then repeat this process.

Referring now to Figure 3, in order to bond laminates 16, 18, and 20 to each other, we select warp yarns 36 from laminate 18 and pass them up into laminate 16 to engage weft yarns 26 of laminate 16 at points, indicated generally by the reference character 38, to form bonds between laminates 16 and 18 at points 38. We return the selected bonding warp yarns 36 to their home laminate 18 for a predetermined number of picks and then draw them downwardly into laminate 20 to engage weft yarns 26 of laminate 20 at points, indicated generally by the reference character 40, to form bonds between laminates 18 and 20 at those points. We repeat this process throughout the lengths of warps 36 to form other spaced bonds 38 and 40 along the lengths of the warps. We may use any spacing between adjacent bonds 38 and adjacent bonds 40. Conveniently, we retain each of the selected bonding warp yarns 36 on its home laminate for two picks, draw it up into laminate 16 for one pick, return it to its home laminate 18 for two picks, draw it down into laminate 20 for one pick, and repeat this process throughout the length of each yarn 36. Warp yarns 36 of laminate 18 are displaced in the direction of the weft yarns from the yarns 30 which form the bonds between laminates 12 and 14 and 14 and 16.

Referring again to Figure 2, in order to form bonds between laminates 20 and 22 and 22 and 24, we select warp yarns 42 of laminate 22 and pass them upwardly into laminate 20 to engage weft yarns 26 of laminate 20 at points, indicated generally by the reference character 44, to form bonds between laminates 20 and 22 at those points. After returning warp yarns 42 to their home laminate 22, we pass the yarns down into laminate 24 to engage weft yarns 26 of laminate 24 at points, indicated generally by the reference character 46, to form bonds between laminates 22 and 24 at those points. Conveniently, we retain a selected warp yarn 42 in its home laminate 22 for two picks, draw it up into laminate 20 for one pick, return it to its home laminate 22 for two picks, draw it downwardly into laminate 24 for one pick, and repeat this procedure throughout the length of yarns 42.

Referring now to Figure 1, which shows the position of the bonds projected upwardly, it can be seen that adjacent warp yarns 30 are spaced a predetermined distance apart transversely of the direction of the warp yarns. This distance may conveniently be selected to be equal to the distance between adjacent bonds 32 or adjacent bonds 34, the projection of the position of which is indicated by arrows in Figure 1. In order to form bonds 38 and 40, we select yarns 36 which are halfway between adjacent yarns 30. The arrangement is such that a line passing downwardly through a bond 32 passes halfway between a pair of corresponding bonds 38 formed by adjacent yarns 36. This staggering of bonds 38 and 40 with respect to bonds 32 and 34 ensures a proper distribution and hence improved dissipation of the force of impact of a flying fragment, missile, or like projectile among the bonds. Conveniently, respective bonds 44 and 46 formed by yarns 42 underlie bonds 32 and 34 formed by yarns 30. While we have shown and described a particular relative disposition of the bonds between the laminates of our fabric, it will be appreciated that we may use any relative disposition and spacing we desire. Also while we have shown a fabric including seven laminates, it will be appreciated that we may use any number of laminates bonded in the manner disclosed. Preferably, we employ an odd number of laminates to achieve a symmetrically woven fabric.

In use of our improved ballistic fabric, we first weave the fabric in the manner shown, selecting warp yarns of an intermediate layer to form bonds between this layer and the layers immediately above and below it. We form our fabric with a number of laminates which afford the desired degree of protection against penetration. We so space the bonds between laminates as to give the desired ballistic properties to the fabric. After we have woven our fabric, we may manufacture any type of protective clothing or may embody our improved fabric in any article which is to be resistant to penetration by flying fragments, missiles, or like projectiles. In resisting penetration the bonds between adjacent laminates of our fabric permit differential deflection between the laminates to absorb the force of impact of a flying fragment, missile, or the like. Since each bonding yarn in the direction of its length alternately passes into a laminate above its home laminate and into a laminate below its home laminate in forming a pair of successive bonds, the force of impact which tends to deflect the laminates differentially creates tension in a greater length of the yarn with the result that the ballistic properties of the fabric are improved.

While we may use any suitable material to form the respective warp and weft yarns of our fabric, preferably we employ yarns made from synthetic, continuous filament threads spun to a predetermined number of convolutions per unit length. Advantageously, the strength of the yarns selected as bonding yarns may be varied with respect to the remainder of the yarns in the fabric to improve the ballistic properties of the fabric. It is to be understood that the weft yarns could form the bonds between laminates as well as the warp yarns. Since it is more convenient to weave warp yarns to form the bonds, we have shown and described warp yarns as forming the bonding. Our construction permits us to control the spacing between adjacent bonds no matter how many fabric laminates are included.

It will be seen that we have accomplished the objects of our invention. We have provided an improved ballistic fabric for resisting penetration by flying fragments, missiles, and the like. The bonds of our fabric may have any desired spacing no matter how many laminates are included in the fabric. Thus we are able to avoid long spacing between bonds when a large number of laminates are used. We so space the bonds that the force of impact of a flying fragment, missile, or like projectile is shared by a large number of bonds.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A ballistic fabric including in combination at least five fabric laminates assembled in stacked relationship, each of said laminates including a plurality of warp yarns and a plurality of weft yarns, a selected warp yarn of the second of said five laminates being drawn up into the first of said five laminates and down into the third of said five laminates at spaced points along the length of said warp yarn to form bonds between said first and said second and said third laminates, a selected warp yarn of the fourth of said five laminates being drawn up into said third laminate and down into the fifth of said five laminates at spaced points along the length of said warp yarn to form bonds between said third and said fourth and said fifth laminates.

2. A ballistic fabric as in claim 1 in which the selected yarn of said fourth laminate is spaced in the direction of said weft yarns a predetermined distance from the selected yarn of said second laminate.

3. A ballistic fabric as in claim 1 including a sixth and a seventh laminate assembled in stacked relationship with said five laminates, each of said sixth and seventh laminates including a plurality of weft yarns and a plurality of warp yarns, a selected warp yarn of said sixth laminate being drawn up into said fifth laminate and down into said seventh laminate at spaced points along the length of said warp yarn to form a plurality of bonds between said fifth and said sixth and said seventh laminates.

4. A ballistic fabric including in combination at least five fabric laminates assembled in stacked relationship, each of said laminates including a plurality of warp yarns and a plurality of weft yarns, a selected warp yarn of the second of said five laminates successively being drawn up into the first of said five laminates and being interwoven with at least one yarn thereof, being returned to said second laminate and being interwoven with at least one yarn thereof and being drawn into the third of said five laminates and being interwoven with at least one yarn thereof at spaced points along the length of said warp yarn to form bonds between said first and said second and said third laminates, a selected warp yarn of the fourth of said five laminates successively being drawn up into said third laminate and being interwoven with at least one yarn thereof, being returned to said fourth laminate and being interwoven with at least one yarn thereof and being drawn into the other of its adjacent laminates and being interwoven with at least one yarn thereof at spaced points along the length of said fourth laminate warp yarn to form bonds between said third and said fourth and said fifth laminates.

5. A ballistic fabric including in combination at least five fabric laminates assembled in stacked relationship, said laminates being formed of weft and warp yarns having substantially the same characteristics, said laminates including substantially the same number of weft yarns per unit length and substantially the same number of warp yarns per unit width, a selected warp yarn of the second of said five laminates successively being drawn up into the first of said five laminates and being interwoven with at least one yarn thereof, being returned to said second laminate and being interwoven with at least one yarn thereof and being drawn into the third of said five laminates and being interwoven with at least one yarn thereof at spaced points along the length of said warp yarn to form bonds between said first and said second and said third laminates, a selected warp yarn of the fourth of said five laminates successively being drawn up into said third laminate and being interwoven with at least one yarn thereof, being returned to said fourth laminate and being interwoven with at least one yarn thereof and being drawn into the other of its adjacent laminates and being interwoven with at least one yarn thereof at spaced points along the length of said fourth laminate warp yarn to form bonds between said third and said fourth and said fifth laminates.

References Cited in the file of this patent

UNITED STATES PATENTS

| | | |
|---|---|---|
| 400,579 | Maddox | Apr. 2, 1889 |
| 710,775 | Hardwick | Oct. 7, 1902 |
| 870,697 | Stevenson | Nov. 12, 1907 |
| 975,940 | Fetterly | Nov. 15, 1910 |
| 1,383,693 | Bolton | July 5, 1921 |
| 1,963,898 | Hainsworth | June 19, 1934 |
| 2,664,922 | Waters et al. | Jan. 5, 1954 |
| 2,816,578 | Frieder et al. | Dec. 17, 1957 |